Nov. 25, 1930.  W. S. ELLIOTT  1,782,959
DISTILLING APPARATUS
Filed March 27, 1923  3 Sheets-Sheet 1

INVENTOR
William S. Elliott,
by Byrnes, Stebbins & Parmelee
his attys.

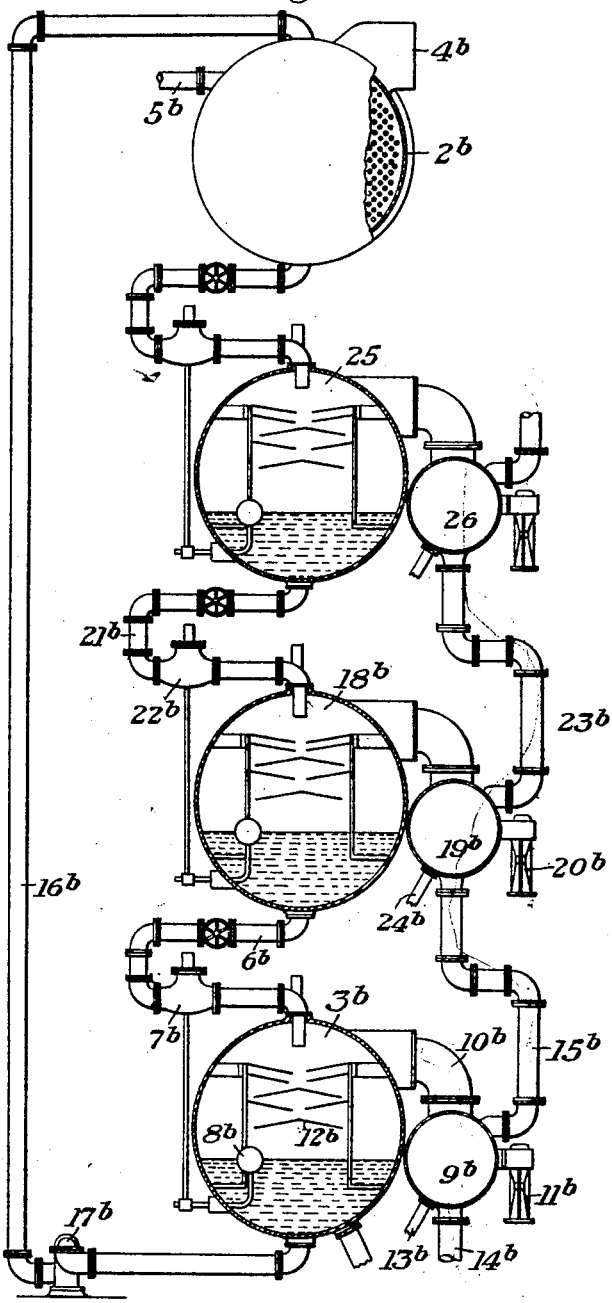

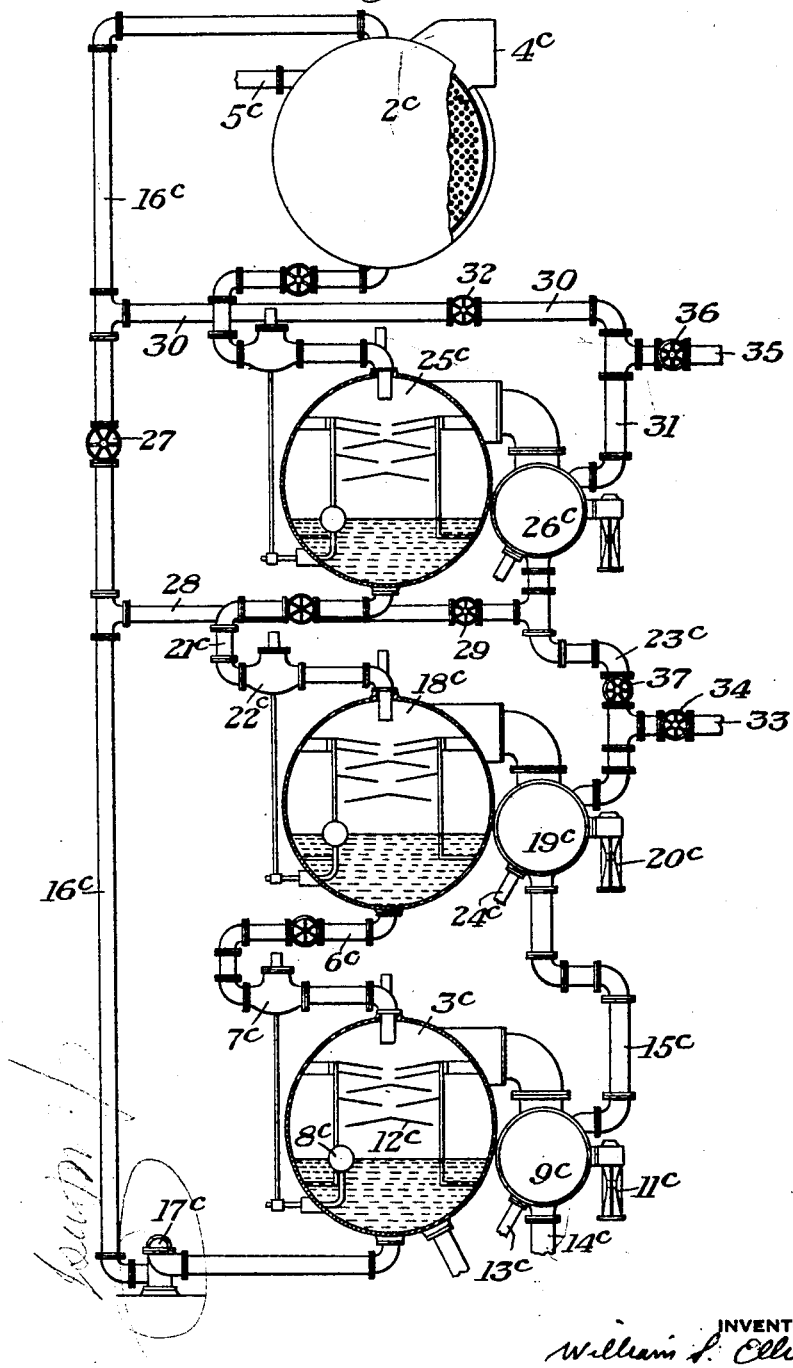

Patented Nov. 25, 1930

1,782,959

UNITED STATES PATENT OFFICE

WILLIAM S. ELLIOTT, OF PITTSBURGH, PENNSYLVANIA

DISTILLING APPARATUS

Application filed March 27, 1923. Serial No. 628,151.

The present invention relates broadly to liquid treating and heat exchanging apparatus, and more particularly to distilling apparatus.

It has heretofore been proposed, as disclosed, for example, in my prior Patent No. 1,321,999, of November 18, 1919, to treat liquid for effecting the release of all of its dissolved air, by producing a change of phase of the liquid to an extent sufficient to release substantially all of the contained air. One embodiment of that invention comprises providing a chamber in which definite temperature and pressure conditions are maintained, and admitting thereto liquid which is at a definitely higher temperature than the temperature corresponding to the pressure in the chamber. Broadly, this involves the evaporation or change of phase of a percentage of the total amount of liquid being treated sufficient to insure release of the contained air, and the recovery of the heat released in the chamber.

By the present invention there is provided an evaporator, and a method of operating the same in accordance with certain of the principles of said patent, for the commercial production of distilled water.

In the accompanying drawings, there are shown, for purposes of illustration only, certain embodiments of the present invention, it being understood that the drawings, which are largely diagrammatic, do not define the limits of my invention, as changes may obviously be made in the construction and operation disclosed without departing from the spirit of my invention or scope of my broader claims.

In the drawings,—

Figure 3 is a view similar to Figure 1, illustrating a three-stage evaporator; and Figure 4 is a view similar to Figure 3, illustrating a modified form of three-stage evaporator.

Figure 1:
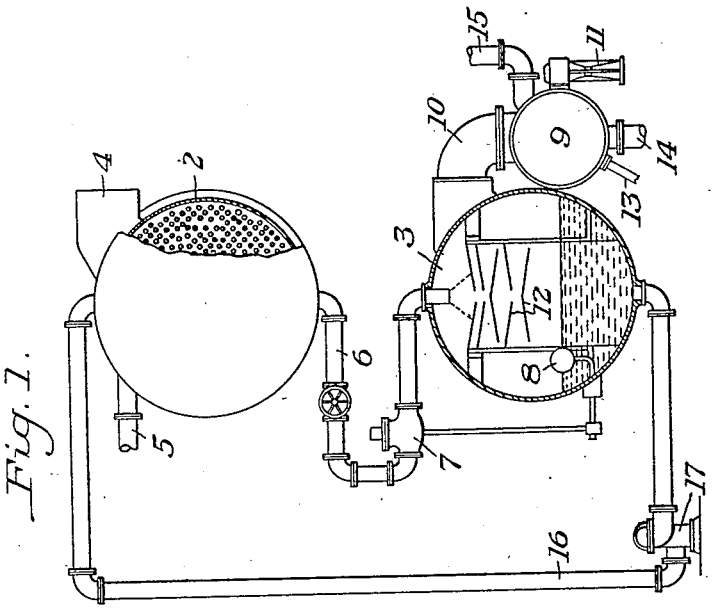
Figure 1 is a diagrammatic elevational view, partly in section and partly broken away, illustrating a single stage evaporator constructed in accordance with the present invention.

Referring first to that form of the invention illustrated in Figure 1, the evaporator may comprise a heater 2 and an evaporating chamber 3. The heater 2 may be connected to a source of heat, such as steam, through a suitable connection 4, and to a source of raw make-up water or raw liquid to be evaporated, through a connection 5. It will be understood that the admission of the heating medium through the connection 4 may be thermostatically controlled in accordance with power plant practice, for automatically maintaining predetermined temperature conditions within the heater, or that it may be manually controlled for this purpose. The water space of the heater is operatively connected to the evaporating chamber by a connection 6 having therein a float operated valve 7 controlled by a float 8 in the evaporating chamber. Due to this construction, it will be apparent that when the level of the liquid in the evaporating chamber falls below a predetermined point, the valve 7 will be opened to admit additional liquid from the heater 2. As the liquid level in the evaporating chamber rises, the float operated valve will be closed to cut off this supply of heated liquid. In this manner, the supply of liquid to the evaporating chamber may be accurately controlled in accordance with the level therein independently of the temperature and pressure conditions prevailing within the chamber. Under these conditions, so long as there is a sufficient flow of liquid through the connection 5 there will always be maintained a liquid seal on the connection 6 by reason of which it will be possible to maintain different temperatures and pressures in the heater and evaporating chamber, respectively.

For maintaining within the evaporating chamber temperature and pressure conditions which are definitely materially lower than the temperature and pressure conditions within the heater 2, there is provided a condenser 9 having its inlet in communication with the vapor space in the evaporating chamber through a connection 10, and an ejector 11 for withdrawing the non-condensible gases. The condenser 9 may be of any desired construction, such, for example, as that shown in my United States Patent No. 1,497,491 of June 10, 1924. By properly proportioning the condenser and the ejector, it will be apparent that there may be continuously maintained within the evaporating chamber, as pointed out in my earlier patent referred to, temperature and pressure conditions which are definitely different from those in the heater. This makes it possible to supply to the evaporating chamber from the heater liquid which is in a superheated condition relative to the temperature in the evaporating chamber, and at a definitely higher temperature than the temperature therein, whereby there is an instantaneous flashing of the liquid at the expense of its contained heat. This effects evaporation or change of phase of a percentage of the total volume of liquid passing through the evaporator, effective for releasing substantially all of the dissolved air. Preferably, the entering liquid is further broken up and agitated by causing it to flow in cascade over suitable pans 12.

The vapors released in the evaporating chamber pass to the condenser 9 and are condensed therein, the condensate or distilled water being withdrawn for use through a connection 13 of such nature that the condensate may be fed in its air-free condition, without further contact with the air, directly to a point of use. The condensing liquid may be supplied to the condenser 9 through an inlet 14, and may leave the same through an outlet 15. In power plant practice, this condensing liquid will be the condensate coming from the main condenser of the plant, and the heat recovered in the condenser 9 will raise the temperature of the condensate in proportion to the amount of heat absorbed in the condenser by the water on its way therethrough. This water could then be passed to another heater where its temperature could be raised to the amount desired before being again fed to the boiler.

The unevaporated portion of the liquid is re-circulated from the liquid space of the evaporating chamber to the liquid space of the heater by a connection 16 having a circulating pump 17 therein. In this manner the heat of the unevaporated portion of the liquid is conserved, and upon being reheated it is again flashed in the evaporating chamber. The connection 5 makes it possible to continuously maintain within the evaporator the total amount of liquid desired.

In actual practice, it may be assumed that a temperature of 210° F., substantially equivalent to atmospheric pressure, is maintained in the heater 2 and a temperature of 140° F. is maintained in the evaporating chamber. The difference between the heater and the evaporating chamber in such case would be 70 degrees, and each pound of water flowing from the heater to the evaporating chamber would give up substantially 70 B. t. u.'s and would consequently evaporate slightly less than 7 percent of the total amount of liquid. The evaporated portion of the liquid would then be condensed in the condenser 9 and the condensate therefrom led to a point of use without further contamination.

Figure 2:
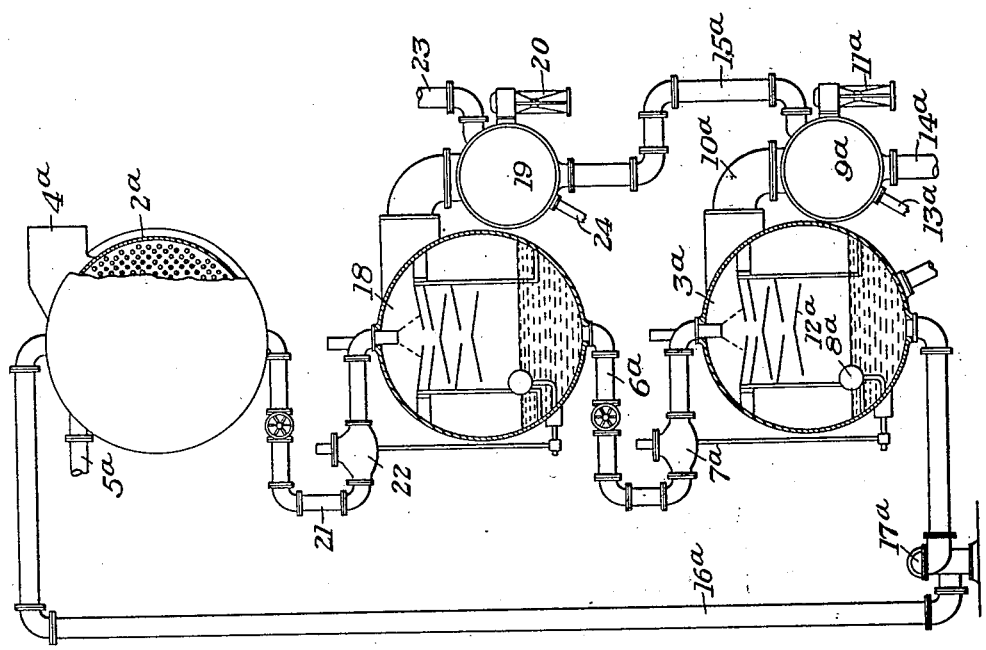
Figure 2 is a view similar to Figure 1, illustrating a two-stage evaporator.

In Figure 2 there is a disclosed two-stage evaporator in which parts corresponding to those parts already described are designated by the same reference characters having an "a" suffixed thereto. In this arrangement, however, there is provided intermediate the heater $2^a$ and the evaporating chamber $3^a$ a second evaporating chamber 18. This evaporating chamber is of a construction similar to that already described, and is provided with its own separate condenser 19 and ejector 20. It is connected to the liquid space in the heater $2^a$ through a connection 21 having a float controlled valve 22, and has its own liquid space connected to the vapor space in the evaporating chamber $3^a$ through the connection $6^a$. The condensers $9^a$ and 19 may be connected in series, whereby the condensing liquid from the condenser $9^a$ may flow through the outlet $15^a$ to the condenser 19, wherein its temperature will be further raised, and then through the outlet 23 to a separate heater, as before described.

With the construction of Figure 2 it will be apparent that there may be maintained in the evaporating chambers 18 and $3^a$ progressively lower temperature and pressure conditions, whereby the relatively superheated liquid from the heater $2^a$ will flash in the evaporating chamber 18, and then when fed to the evaporating chamber $3^a$ will again flash therein. The desired temperature conditions may be maintained in the chambers 18 and $3^a$ by the condensers 19 and $9^a$ and the ejectors 20 and $11^a$ respectively. The total pressure drop to which the liquid is subjected while passing through the different evaporating chambers may be proportioned therebetween in any desired manner, as will be apparent. If a total pressure drop of 70 degrees F. is desired, this may be so divided as to effect a drop of 35 degrees in the chamber 18 and a similar drop in the chamber $3^a$. The condenser 19 will be provided with a condensate outlet 24 for conducting the condensate or distilled water in uncontaminated form directly to a point of use.

In Figure 3 there is illustrated a three-stage evaporator in which the parts corresponding to the parts already described are designated by the same reference numerals as those heretofore used, but with a "b" suffixed thereto. In this construction there is provided a third evaporating chamber 25 intermediate the heater $2^b$ and the evaporating chamber $18^b$. In other respects, the apparatus corresponds to that already described, and it will be apparent that the pressure differences between the respective evaporating chambers may be in any desired proportion whereby the percentage of the liquid which is flashed in each of the evaporating chambers may be definitely controlled.

In some cases it has been found that the temperature of the condensing liquid passing from the last condenser 26, as shown in Figure 3, may be higher than desired. In this event, it may be preferable to deliver this condensing liquid from the intermediate condenser $19^b$ to a heater or the like and supply a separate condensing liquid for the condenser 26. In Figure 4 there is illustrated a modification in which such an operation is possible. In this figure parts corresponding to parts already described are designated by the same reference numerals having a "c" suffixed thereto. In this embodiment of the invention, the circulating connection $16^c$ is provided intermediate the pump $17^c$ and the heater $2^c$ with a valve 27. Connected to the circulating connection on one side of the valve 27 is a bypass 28 communicating with the outlet $23^c$ from the condenser $19^c$ through a controlling valve 29. Connected to the circulating connection on the opposite side of the valve 27 is a second pipe 30 communicating with the outlet 31 from the condenser $26^c$ through a valve 32. Leading from the outlet connection $23^c$ is a pipe 33 having a controlling valve 34, while leading from the outlet connection 31 for the condenser $26^c$ is a pipe 35 having a controlling valve 36. The connection $23^c$ is also provided with a supplemental controlling valve 37.

With the construction illustrated in this figure, it is possible to operate the apparatus in several different ways. In accordance with one method, it may be operated in a manner similar to that shown in Figure 3. This result is obtained by opening the valves 27 and 37 and closing the valves 29, 32 and 34, and opening the valve 36. At such times, the unevaporated portion of the liquid from the evaporating chamber $3^c$ will pass directly to the heater $2^c$, while the condensing condensate will pass successively through the three condensers $9^c$, $19^c$, and $26^c$, to the pipe 35.

Where it is found that the temperature of the condensing condensate leaving the condenser $26^c$ is too high, the apparatus may be operated by opening the valves 34, 29 and 32, and closing the valves 27, 36 and 37. At such times, the condensing liquid will leave the condenser $19^c$ and pass to a heater or the like through the pipe 33. The unevaporated portion of the liquid from the evaporating chamber $3^c$ will be directed from the re-circulating connection $16^c$, connection 28, and valve 29 to the inlet of the condenser $26^c$, and thence through the outlet 31, valve 32, pipe 30, and re-circulating connection $16^c$, to the heater $2^c$. It will be apparent that the temperature of the unevaporated portion of the liquid leaving the evaporating chamber $3^c$ will be lower than the temperature of the vapor released in the evaporating chamber $25^c$, whereby the unevaporated portion of the liquid from the evaporating chamber $3^c$ may effectively serve as a condensing medium for the condenser $26^c$. In this manner the temperature of the condensing liquid leaving the condenser $19^c$ may be kept at the desired point, and the heat released in the evaporating chamber $25^c$ may be recovered and imparted to the unevaporated portion of the liquid during its return to the heater.

By the present invention there is provided an evaporator and a method of operating the same for securing an air-free condensate.

By varying the number of evaporating chambers provided, the load on each chamber may be effectively controlled and the total amount of distilled water obtained in air-free condition may be varied.

Further advantages arise from the provision of an evaporator in which the heat of the unevaporated portion of the liquid, as well as the heat of the vapor released, is recovered and utilized.

It will be apparent that the present invention adapts itself to use with apparatus of different forms within the scope of the following claims.

I claim:

1. An evaporating system, comprising a heater having a water space and having steam and water connections, a series of evaporating chambers communicating with each other and with the water space of the heater, means for maintaining in said chambers definite temperature and pressure conditions progressively lower than the temperature and pressure conditions maintained in the heater, means for admitting the heated water successively to said chambers whereby is will flash therein, and means for returning the unevaporated water to the heater.

2. In a water deaerating, distilling and evaporating system, a heater, a plurality of evaporating chambers, means for supplying water to said heater and then passing the same successively to said evaporating chambers and returning the unevaporated portion of the water from the last evaporating chamber to the heater, and separate means for condensing the vapor released in each of the evaporating chambers.

3. In an evaporating system, a heater, a plurality of evaporating chambers, means for supplying water to said heater and then passing the same successively to said evaporating chambers and returning the unevaporated portion of the water from the last evaporating chamber to the heater, separate condensers for condensing the vapors released in each of said evaporating chambers, and means for passing a condensing water successively through said condensers.

4. In an evaporating system, a heater, a plurality of evaporating chambers, means for supplying water to said heater and then passing the same successively to said evaporating chambers and returning the unevaporated portion of the water from the last evaporating chamber to the heater, separate condensers for condensing the vapors released in each of said evaporating chambers, and means for passing a condensing liquid successively through all or a part only of said condensers.

5. In an evaporating system, a heater, a plurality of evaporating chambers, means for supplying water to said heater and then passing the same successively to said evaporating chambers and returning the unevaporated portion of the water from the last evaporating chamber to the heater, separate condensers for condensing the vapors released in each of said evaporating chambers, means for passing a condensing liquid successively through certain of said condensers, and means for conducting the unevaporated portion of the water flowing from the last evaporating chamber to at least one of said condensers.

6. In an evaporating system, a heater, a plurality of evaporating chambers, means for supplying water to said heater and then passing the same successively to said evaporating chambers and returning the unevaporated portion of the water from the last evaporating chamber to the heater, separate condensers for condensing the vapors released in each of said evaporating chambers, means for passing a condensing liquid successively through certain of said condensers, and means for conducting the unevaporated portion of the water flowing from the last evaporating chamber to the condenser communicating with that evaporating chamber which first receives the heated water from the heater.

7. In the method of evaporating water, the steps consisting in heating the water, passing the same in sequence through a plurality of chambers having progressively lower temperatures and pressures maintained therein, separately condensing the vapors released in each of said chambers, and then withdrawing the unevaporated portion of the water from the last of said chambers, re-heating the same, and again passing it through said chambers.

8. In the method of evaporating water, the steps consisting in heating the water, passing the same in sequence through a plurality of chambers having progressively lower temperatures and pressures maintained therein, condensing the vapors released in each of said chambers, and then withdrawing the unevaporated portion of the water from the last of said chambers, re-heating the same, and again passing it through said chambers.

9. An evaporating system, comprising a heater having a source of heat, an evaporating chamber in which is maintained a temperature lower than that maintained in the heater, float operated means for admitting the heated water to the evaporating chamber in a superheated condition relative to the temperature maintained in said evaporating chamber, means for condensing the vapor released in said evaporating chamber, and means for returning all of the unevaporated water from the evaporating chamber to the heater.

10. In an evaporating system, a heater, a plurality of evaporating chambers, means for supplying water to said heater and then passing the same successively to said evaporating chambers, separate condensers for condensing the vapors released in each of said evaporating chambers, and means for passing a condensing fluid successively through all or a part only of said condensers.

11. In an evaporating system, a heater, means for supplying water thereto, a plurality of evaporating chambers, means for passing water from the heater serially through said chambers, a condenser cooperating with each of said evaporating chambers, and connections for passing a cooling liquid serially through all of said condensers or a part only of said condensers.

12. In an evaporating system, a heater, means for supplying water thereto, a plurality of evaporating chambers, means for passing water from the heater serially through said chambers, a condenser cooperating with each of said evaporating chambers, connections for passing a cooling liquid serially through all of said condensers or a part only of said condensers, and means operative at will for directing the unevaporated portion of the water from one of said evaporating chambers to at least one of said condensers.

13. In an evaporating system, a heater, means for supplying water thereto, a plurality of evaporating chambers, connections to pass heated water in succession from said heater through said chambers, an individual condenser cooperating with each of said evaporating chambers, and a plurality of means for supplying cooling water to at least one of said condensers.

14. In an evaporating system, a heater, a plurality of evaporating chambers adapted to receive heated water in succession from said heater, connections for passing water from said heater serially through said chambers, an individual condenser cooperating with each of said evaporating chambers, and a plurality of sources of cooling water supply for at least one of said condensers, one of said sources comprising an operative connection with one of the evaporating chambers, permitting the passage of unevaporated water therethrough.

15. An evaporating system, comprising a heater having a source of heat and water, an evaporating chamber in which is maintained a temperature lower than that maintained in the heater, connections for admitting the heated water to the evaporating chamber in a superheated condition relative to the temperature maintained in said evaporating chamber, said connections including float means for cutting off the flow of water from the heater when a certain level is reached in the evaporating chamber, means for withdrawing the vapor released in said evaporating chamber, and means for returning all of the unevaporated water from the evaporating chamber to the heater.

In testimony whereof I have hereunto set my hand.

WILLIAM S. ELLIOTT.